US006529256B1

United States Patent
Seo

(10) Patent No.: US 6,529,256 B1
(45) Date of Patent: Mar. 4, 2003

(54) IN-PLANE SWITCHING MODE LIQUID CRYSTAL DISPLAY DEVICE

(75) Inventor: Seong Moh Seo, Amyang-shi (KR)

(73) Assignee: LG.Philips LCD Co., Ltd., Seoul (KR)

(*) Notice: Subject to any disclaimer, the term of this patent is extended or adjusted under 35 U.S.C. 154(b) by 0 days.

(21) Appl. No.: 09/645,332

(22) Filed: Aug. 25, 2000

Related U.S. Application Data

(62) Division of application No. 09/079,894, filed on May 15, 1998.

(30) Foreign Application Priority Data

May 19, 1997 (KR) ............................................. 97-19200

(51) Int. Cl.[7] ............................................. G02F 1/1343
(52) U.S. Cl. ........................... 349/141; 349/42; 349/43; 349/44
(58) Field of Search ............................ 349/141, 42, 43, 349/44

(56) References Cited

U.S. PATENT DOCUMENTS

| 4,239,346 A | 12/1980 | Lloyd ......................... 350/334 |
| 4,726,659 A | 2/1988 | Conrad et al. ............... 350/341 |
| 5,307,189 A | 4/1994 | Nishiki et al. ................ 359/59 |
| 5,321,535 A | 6/1994 | Ukai et al. .................... 359/55 |
| 5,459,596 A | 10/1995 | Ueda et al. .................... 359/59 |
| 5,464,669 A | 11/1995 | Kang et al. .................... 428/1 |

(List continued on next page.)

FOREIGN PATENT DOCUMENTS

| EP | 0 368 260 | 5/1990 |
| EP | 0 588 568 | 9/1993 |
| EP | 0 749 029 | 12/1996 |
| JP | 60-158421 | 8/1985 |
| JP | 62-078532 | 4/1987 |

(List continued on next page.)

OTHER PUBLICATIONS

S. Matsumoto, Display Characteristics of In–Plane Switching (IPS) LCDs and a Wide–Viewing–Angle 14.5–in. IPS TFT–LCD; Euro Display '96, pp. 445–448.
H. Wakemoto, "An Advanced In–Plane–Switching Mode", TFT–LCD, 1997 SID Digest, pp. 929–932.
M–Oh–e, "Principles and Characteristics of Electro–Optical Behaviour with In–Plane Switching Mode", Asia Display '95, pp. 577–580.
M. Ohta, "Development of Super–TFT–LCDs With In–Plane Switching Display Mode", 1995, Asia Display '95, pp. 707–710.
S. H. Lee, "High–Transmittance, Wide–Viewing–Angle Nematic Liquid Crystal Display Controlled by Fringe–Field Switching", Asia Display '98, pp. 371–374.
R. Kiefer, "In–Plane Switching of Nematic Liquid Crystals", Japan Display '92, pp. 547–550.

*Primary Examiner*—Kenneth Parker
*Assistant Examiner*—David Chung
(74) *Attorney, Agent, or Firm*—McKenna Long & Aldridge LLP

(57) ABSTRACT

An in-plane switching mode liquid crystal display device includes first and second substrates. A plurality of gate and data bus lines define pixel regions and arranged on the first substrate. A plurality of thin film transistors are adjacent respective cross points of the gate and data bus lines. A plurality of gate electrodes are connected to said gate bus lines. A gate insulator is on the gate electrodes and a first metal layer includes a plurality of first electrodes on the gate insulator. A passivation layer is on the first metal layer. A transparent second metal layer includes a plurality of second electrodes on the passivation layer, the first and second electrodes applying plane electric fields.

19 Claims, 4 Drawing Sheets

U.S. PATENT DOCUMENTS

| | | | |
|---|---|---|---|
| 5,492,762 A | 2/1996 | Hirai et al. | 428/447 |
| 5,576,858 A | 11/1996 | Ukai et al. | 359/59 |
| 5,598,285 A | 1/1997 | Kondo et al. | 349/39 |
| 5,600,464 A | 2/1997 | Ohe et al. | 349/123 |
| 5,602,662 A | 2/1997 | Rosenblatt et al. | 349/130 |
| 5,608,556 A | 3/1997 | Koma | 349/143 |
| 5,646,705 A | 7/1997 | Higuchi et al. | 349/143 |
| 5,686,019 A | 11/1997 | Nakamura | 252/299.01 |
| 5,737,051 A | 4/1998 | Kondo et al. | 349/141 |
| 5,742,369 A | 4/1998 | Mihara et al. | 349/123 |
| 5,745,207 A | 4/1998 | Asada et al. | 349/141 |
| 5,757,455 A | 5/1998 | Sugiyama et al. | 349/129 |
| 5,760,856 A | 6/1998 | Yanagawa et al. | 349/42 |
| 5,760,857 A | 6/1998 | Yanagawa et al. | 349/43 |
| 5,781,261 A | 7/1998 | Ohta et al. | 349/111 |
| 5,786,876 A * | 7/1998 | Ota et al. | 349/42 |
| 5,793,459 A | 8/1998 | Toko | 349/128 |
| 5,831,701 A | 11/1998 | Matsuyama et al. | 349/110 |
| 5,841,499 A | 11/1998 | Baur et al. | 349/141 |
| 5,852,485 A | 12/1998 | Shimada et al. | 349/141 |
| 5,859,682 A | 1/1999 | Kim et al. | 349/124 |
| 5,870,160 A | 2/1999 | Yanagawa et al. | 349/141 |
| 5,886,762 A | 3/1999 | Lee et al. | 349/141 |
| 5,907,380 A | 5/1999 | Lien | 349/141 |
| 5,910,271 A | 6/1999 | Ohe et al. | 252/299.01 |
| 5,914,762 A | 6/1999 | Lee et al. | 349/141 |
| 5,946,060 A | 8/1999 | Nishiki et al. | 349/48 |
| 5,946,067 A | 8/1999 | Kim et al. | 349/141 |
| 5,956,111 A | 9/1999 | Ohta et al. | 349/141 |
| 5,959,708 A | 9/1999 | Lee et al. | 349/143 |
| 5,969,782 A | 10/1999 | Lee et al. | 349/141 |
| 5,977,562 A | 11/1999 | Hirakata et al. | 257/72 |
| 5,995,186 A | 11/1999 | Hiroshi | 349/141 |
| 6,005,650 A | 12/1999 | Kim et al. | 349/130 |
| 6,014,190 A * | 1/2000 | Kim et al. | 349/39 |
| 6,040,887 A | 3/2000 | Matsuyama et al. | 349/141 |
| 6,055,028 A * | 4/2000 | Nishi et al. | 349/33 |
| 6,160,600 A * | 12/2000 | Yamazaki et al. | 349/138 |

FOREIGN PATENT DOCUMENTS

| | | |
|---|---|---|
| JP | 04-067127 | 3/1992 |
| JP | 06-160878 | 6/1994 |
| JP | 06-273803 | 9/1994 |
| JP | 07-036058 | 2/1995 |
| JP | 07-134301 | 5/1995 |
| JP | 07-225388 | 8/1995 |
| JP | 08-062586 | 3/1996 |
| JP | 9-5764 | 1/1997 |
| JP | 09-005763 | 1/1997 |
| JP | 09-005764 | 1/1997 |
| JP | 09-005793 | 1/1997 |
| JP | 09-033946 | 2/1997 |
| JP | 09-043589 | 2/1997 |
| JP | 09-043590 | 2/1997 |
| JP | 09-101538 | 4/1997 |
| JP | 09-105908 | 4/1997 |
| JP | 09-105918 | 4/1997 |
| JP | 09-258269 | 10/1997 |
| JP | 09-269507 | 10/1997 |
| JP | 09-325346 | 12/1997 |
| JP | 10-319436 | 12/1998 |
| KR | 96-32049 | 9/1996 |
| KR | 97-22458 | 5/1997 |
| KR | 98-040330 | 8/1998 |
| KR | 1998-040330 | 8/1998 |
| KR | 98-083765 | 12/1998 |
| WO | 97-10530 | 3/1997 |

* cited by examiner

FIG·1a
PRIOR ART
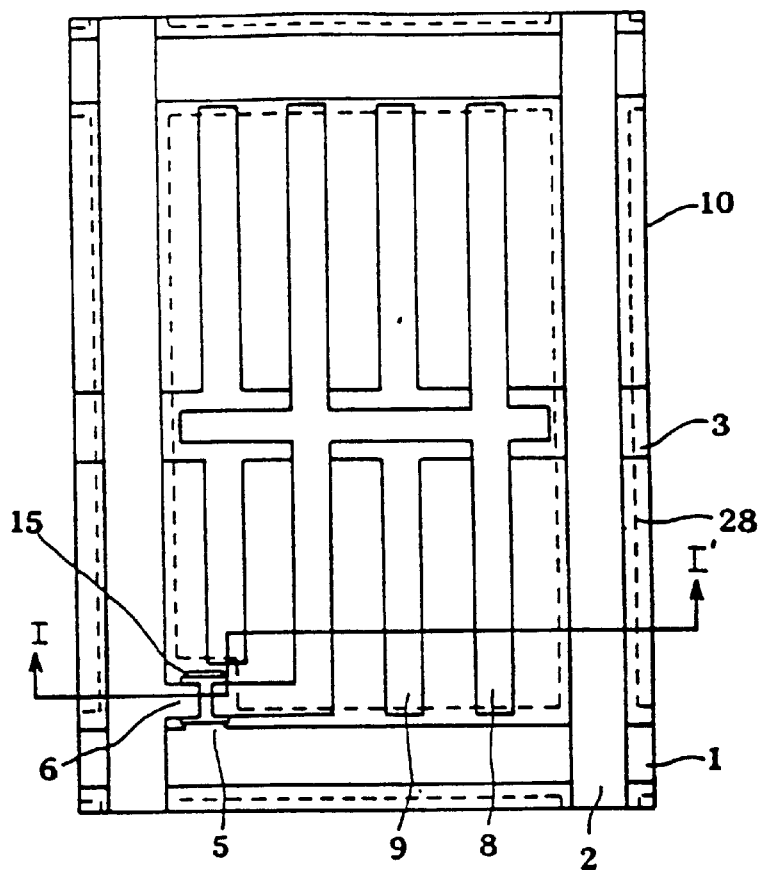
FIG·1b
PRIOR ART
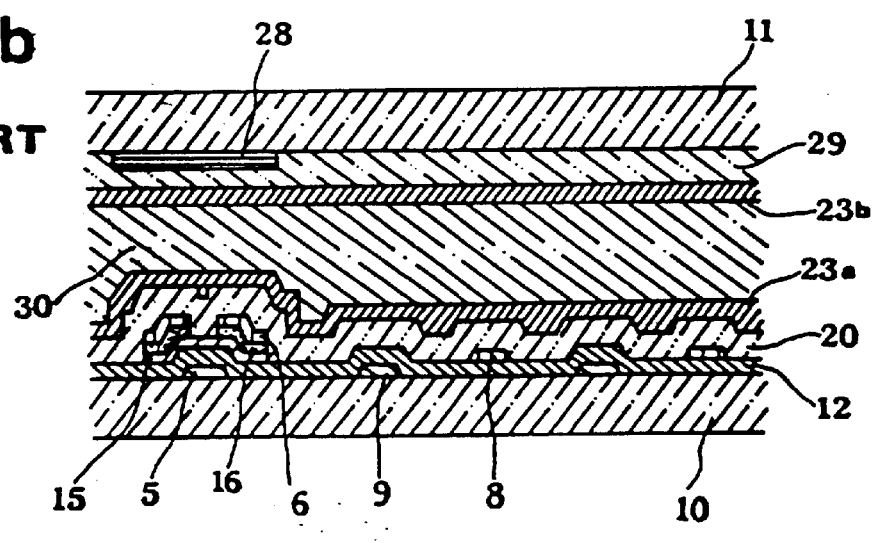

FIG · 4
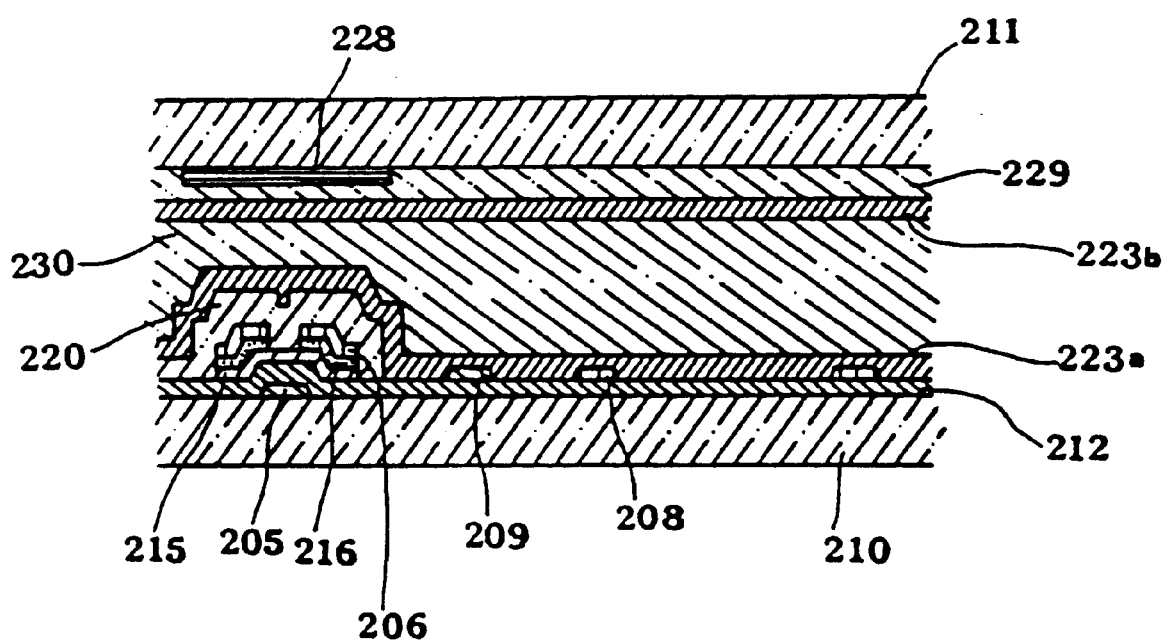

IN-PLANE SWITCHING MODE LIQUID CRYSTAL DISPLAY DEVICE

This application is a division of application Ser. No. 09/079,894 filed May 15, 1998, and claims the benefit of Korean Application No. 1997-19200, filed on May 19, 1997, which is hereby incorporated by reference.

BACKGROUND OF THE INVENTION

1. Field of the Invention

The present invention relates to a liquid crystal display device, and more particularly, an in-plane switching mode liquid crystal display device.

2. Discussion of the Related Art

Twisted nematic liquid crystal display devices (hereinafter TN LCDs) having high image quality and low power consumption are widely applied to flat panel display devices. TN LCDs, however, have a narrow viewing angle due to refractive anisotropy of liquid crystal molecules. This is because horizontally aligned liquid crystal molecules prior to applying a voltage become nearly vertically aligned with respect to the substrate when voltage is applied to the liquid crystal panel.

Recently, in-plane switching mode liquid crystal display devices (hereinafter IPS-LCDs) have been widely studied for improving the viewing angle characteristic. These liquid crystal molecules are nearly horizontally aligned.

FIG. 1a is a plan view of a unit pixel of a conventional active matrix LCD. As shown in FIG. 1a, unit pixel region is defined by a gate bus line 1 and a data bus line 2 in which the lines 1, 2 are arranged perpendicularly and/or horizontally in a matrix on a transparent substrate (first substrate) 10. A common line 3 is arranged parallel to the gate bus line 1 in the pixel region. A thin film transistor (TFT) is formed adjacent a cross point of the data bus line 2 and the gate bus line 1. The TFT, as shown in FIG. 1b which is a sectional view according to line I—I of FIG. 1a, includes a gate electrode 5, a gate insulator 12, a semiconductor layer 15, a channel layer 16, and source/drain electrode 6. The gate electrode S is connected to the gate bus line 1 and source/drain electrode 6 is connected to the data bus line 2. The gate insulator 12 is formed on the whole surface of the first substrate of the first substrate 10.

A common electrode 9 and a data electrode 8 are formed in the pixel region. The common electrode 9 is formed with the gate electrode 5 and connected to the common line 3. The date electrode 8 is formed with the source/drain electrode 6 and electrically connected to the source/drain electrode 6. Further, a passivation layer 20 and a first alignment layer 23a are deposited on the whole surface of the first substrate 10.

On a second substrate 11, a black matrix 28 is formed to prevent a light leakage which is generated around the TFT, the gate bus line 1, and the data bus line 2. A color filter layer 29, and a second alignment layer 23b is formed on the black matrix 28 in sequence. Also, a liquid crystal layer 30 is formed between the first and second substrates 10, 11.

When voltage is not applied to the LCD having the above structure, liquid crystal molecules in the liquid crystal layer 30 are aligned according to alignment directions of the first and second alignment layers 23a, 23b. However, when voltage is applied between the common electrode 9 and the data electrode 8, the liquid crystal molecules are vertically aligned to the extending directions of the common and data electrodes. In the foregoing, since liquid crystal molecules in the liquid crystal layer 30 are switched on the same plane at all times, grey inversion is not created in the up and down direction, and right and left direction of the viewing angle.

In the conventional LCD having the above structure, however, the aperture ratio is decreased by the data electrode 8 and the common electrode 9, which are opaque.

SUMMARY OF THE INVENTION

Accordingly, the present invention is directed to an in-plane switching mode liquid crystal display that substantially obviates one or more of the problems due to limitations and disadvantages of the related art.

An object of the present invention is to provide an LCD having a high aperture ratio.

Another object of the present invention is to provide an LCD having a light transmissive common and data electrodes.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching mode liquid crystal display device comprises first and second substrates; a plurality of gate and data bus lines defining pixel regions and arranged on said first substrate; a plurality of thin film transistors adjacent respective cross points of said gate and data bus lines; a plurality of gate electrodes connected to said gate bus lines; a gate insulator on said gate electrodes; a first metal layer including a plurality of first electrodes on said gate insulator; a passivation layer on said first metal layer; and a transparent second metal layer including a plurality of second electrodes on said passivation layer, wherein said first and second electrodes apply plane electric fields.

In another aspect of the present invention, an in-plane switching mode liquid crystal display device comprises a thin film transistor on a substrate including source, drain, and gate electrodes; a data electrode connected to one of the source and drain electrodes; and a common electrode, wherein the data electrode, the common electrode, and the gate electrode are each on different layers over the substrate.

In another aspect of the present invention, an in-plane switching mode liquid crystal display device comprises a substrate; a thin film transistor including source, drain, and gate electrodes on a portion of the substrate; a first insulating layer on the substrate; a first electrode including a data electrode on the insulating layer; a second insulating layer covering the first electrode; and a second electrode including a common electrode on the second insulating layer, wherein the gate electrode, the first electrode, and the second electrode are on different layers.

In another aspect of the present invention, a method of forming an in-plane switching mode liquid crystal display device comprises the steps of forming a thin film transistor on a substrate including source, drain, and gate electrodes; forming a data electrode connected to one of the source and drain electrodes; and forming a common electrode, wherein the data electrode, the common electrode, and the gate electrode are each on different layers over the substrate.

In a further aspect of the present invention, a method for forming an in-plane switching mode liquid crystal display device comprises the steps of forming a thin film transistor including source, drain, and gate electrodes on a portion of a substrate; forming a first insulating layer on the substrate; forming a first electrode including a data electrode on the insulating layer; forming a second insulating layer covering the first electrode; and forming a second electrode including a common electrode on the second insulating layer, wherein the gate electrode, the first electrode, and the second electrode are on different layers.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings:

FIG. 1a is a plan view of a unit pixel of a conventional in-plane switching mode LCD;

FIG. 1b is a sectional view according to line I—I of FIG. 1a;

FIG. 2b is a sectional view according to line II—II of FIG. 2a;

FIG. 4 is a sectional view of an in-plane switching mode LCD according to another embodiment of the present invention.

DETAILED DESCRIPTION OF THE PREFERRED EMBODIMENTS

Reference will now be made in detail to the preferred embodiments of the present invention, examples of which are illustrated in the accompanying drawings.

An LCD according to the present invention comprises first and second substrates, data and gate bus lines defining a pixel region on the first substrate in which the lines are arranged perpendicularly and/or horizontally in a matrix. Common lines are formed parallel to the gate bus lines. TFTs are formed at respective cross points of the data bus lines and the gate bus lines in the pixel region. At least one data electrode is formed in the pixel region, and at least one transparent common electrode is formed parallel to the data bus lines. A passivation layer is formed on the whole surface of the first substrate. A first alignment layer with a fixed alignment direction is deposited on the passivation layer. A black matrix is formed over the second substrate to prevent light leakage around the TFTs, the gate bus lines, and the data bus lines. A color filter layer is formed on the black matrix and the second substrate. A second alignment layer is deposited on the color filter layer. A liquid crystal layer is between the first and second substrates. The transparent common electrode is connected to the common line, and the data electrode is connected to source/drain electrode of the TFT. The common line may be formed with the common electrode in a single process using the same material or another process using a different material. When the common and data electrodes are formed on the gate insulator, the common line which may be formed with the data bus line in a single process using the same material may also be formed on the gate insulator. Further, the gate pad and the data pad are prevented from oxidizing by the metal layer including ITO (indium tin oxide) is formed thereon by forming the transparent common electrode on the passivation layer.

Figure 2A:
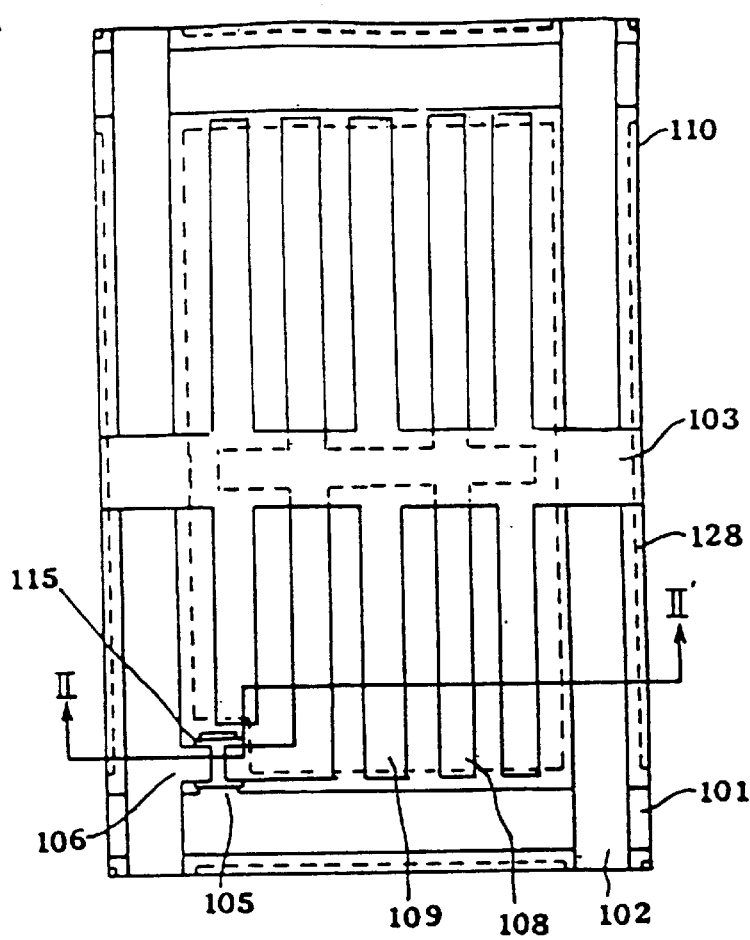
FIG. 2a is a plan view of a unit pixel of an LCD according to one embodiment of the present invention.
Figure 2B:
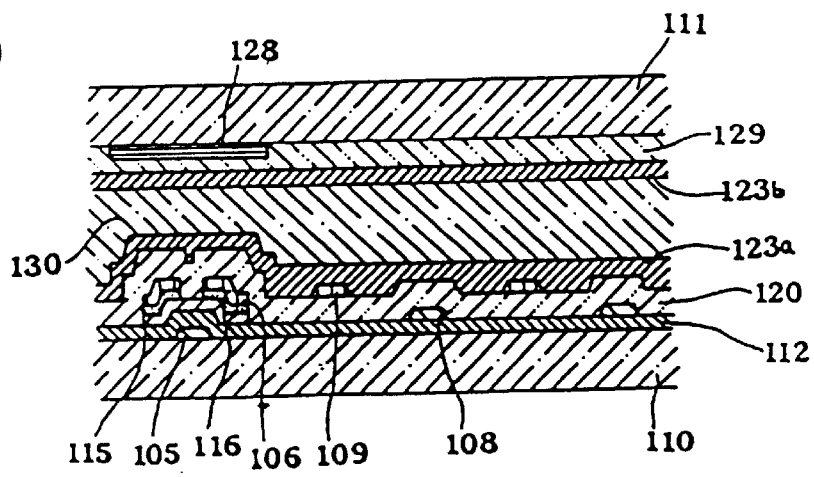

FIGS. 2a and 2b are drawings showing an in-plane switching mode LCD according to one embodiment of the present invention. As shown in FIG. 2a, gate and data bus lines 101, 102 defining a pixel region are arranged perpendicularly and/or horizontally in a matrix on the first substrate 110. Common line 103 is formed parallel to the gate bus line 101. TFTs are respectively formed at cross points of the data bus line 102 and the gate bus line 101 in the pixel region. As shown in FIG. 2b, a TFT includes a gate electrode 105, a gate insulator 112 deposited on the gate electrode 105, a semiconductor layer 115 formed on the gate insulator 112, a channel layer 116 formed on the semiconductor layer 115, and source/drain electrode 106 formed on the channel layer 116. The gate insulator 112 is deposited on the whole surface of the substrate 110.

The gate electrode 105 and the gate bus line 101 are preferably formed by sputtering and photoetching a method such as Al, Mo, or Al alloy in a single process at a surface of the substrate. At this time, it is possible to form an anodic oxidation layer by anodizing the gate bus line 101 and the gate electrode 105 to improve the insulating characteristic. The gate insulator 112 including inorganic material such as SiNx or SiOx is formed by PCVD (plasma chemical vapor deposition) method.

The semiconductor layer 115 is formed by depositing and etching an amorphous silicon by PCVD method, and the channel layer 116 is formed by depositing $n^+a$-Si. The source/drain electrode 106 is formed at the same time with the data electrode 108 by depositing and etching a metal such as Al, Cr, Ti, and Al alloy by a sputtering method. At this time, it is possible to form the semiconductor layer 115, the channel layer 116, and the source/drain electrode 106 by different processes. Also, it is possible to form the semiconductor layer 115 and the channel layer 116 by etching the a-Si layer and the $n^+a$-Si layer on the gate insulator 112. Furthermore, an etch stopper may be formed on the semiconductor layer 115 to prevent the channel region from being etched.

The common line 103 and the common electrode 109 are formed on the passivation layer 120 including an inorganic material such as SiNx or SiOx, or organic material such as BCB (benzocyclobutene) or acryl resin by depositing and etching a transparent metal such as ITO (indium tin oxide) by a sputtering method. At this time, it is possible to form the common line 103 and the common electrode 109 in a same process. Also, these may be formed by different processes using different materials. For instance, the common line 103 may be formed with the gate bus line 101 made of an opaque metal such as Al, Mo, Ta, or Al alloy and the common electrode 109 may be made of a transparent metal such as ITO. Further, the first alignment layer 123a is formed on the passivation layer 120.

Figure 3A:
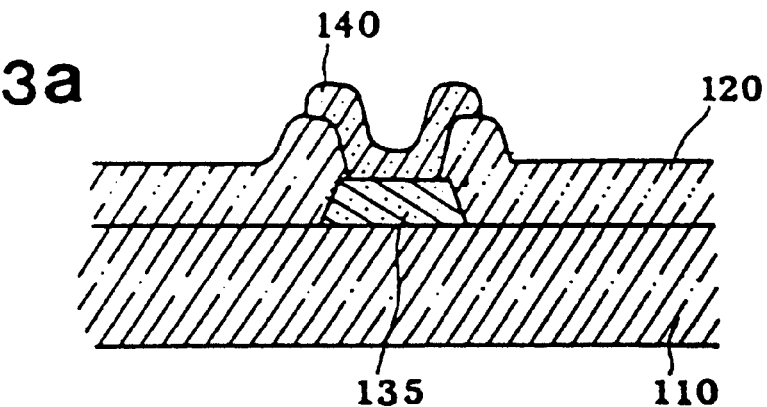
FIG. 3a is a drawing showing an embodiment of a gate pad region according to the present invention.
Figure 3B:
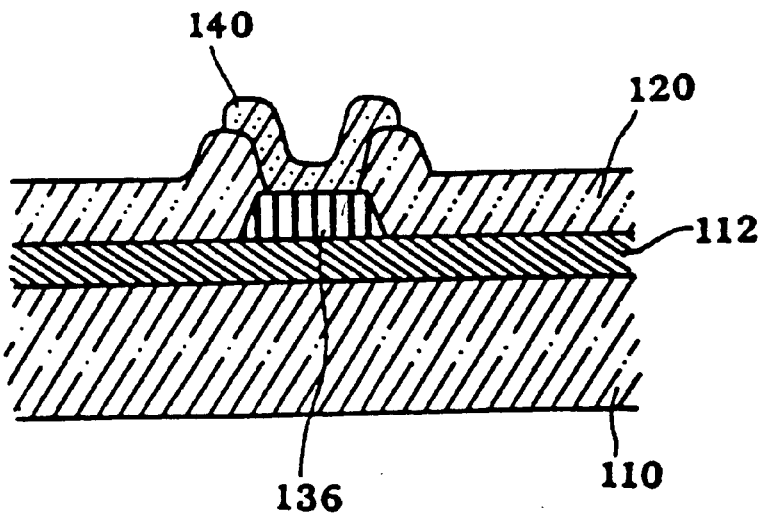
FIG. 3b is a drawing showing an embodiment of a data pad region according to the present invention.

FIG. 3a is a drawings showing a gate pad region, and FIG. 3b is a drawing showing a data pad region according to one embodiment of the present invention. A gate pad 135 is preferably formed at the same time with the gate bus line 102 and the gate electrode 105 on the first substrate 110 at the same time, and a data pad 136 is preferably formed at the same time with the data bus line 101 and the source/drain electrode 106 on the gate insulator 112. The gate pad 135 and the data pad 136 are exposed to outside air, thereby forming oxidation layers on the pads 135 and 136 which cause inferior connections to an outer driving circuit. Therefore, if a metal layer 140 including ITO is formed on the pads 135, 136 with the common electrode 109, it is possible to prevent the pads 135, 136 from oxidizing.

The first alignment layer 123a on the passivation layer includes polyimide, polyamide, or photosensitive material such as PVCN (polyvinylcinnamate) or PSCN (polysiloxanecinnamate). An alignment direction of the layer 123a is determined by rubbing in case of polyimide or polyamide, and by light irradiation using UV (ultraviolet) light in case of a photosensitive material in which the alignment direction is controlled by the polarization direction of an irradiated light.

On the second substrate 111, a black matrix 128 for preventing light leakage at around the gate bus line 101, the data bus line 102, and TFT is formed by depositing a metal such as Cr or CrOx as a shielding layer. Color filter elements R, G, and B are formed in the color filter layer 129 on each of pixel regions. An overcoat layer may be formed on the color filter layer in order to improve its flatness or planarity.

After depositing the second alignment layer 123b made of polyimide or photosensitive material on the overcoat layer, a fixed alignment direction is determined by rubbing or light irradiating thereon, as discussed above. The liquid crystal layer 130 is formed between the first substrate 110 and second substrate 111 by injecting a liquid crystal in a vacuum.

In an LCD having the above structure, when a voltage is applied from the outer driving circuit (not illustrated) to the liquid crystal panel through the TFT, a plane electric field at the surface of the substrate is created between the common electrode 109 and the data electrode 108. By this plane electric field, the liquid crystal molecules aligned according to the alignment directions of the first and second alignment layers 123a, 123b are switched parallel to the substrate, thereby controlling the amount of transmitted light through the liquid crystal layer. However, when a voltage is not applied, the alignment directions of the first and second alignment layers 123a, 123b are vertical to each other, thereby the liquid crystal molecules are in a twist mode in which the liquid crystal is a nematic liquid crystal. If a thickness of the liquid crystal is smaller than a gap between the electrodes 108, 109, the liquid crystal molecules are aligned or in parallel in the liquid crystal layer 130 because the plane electric field is uniformly aligned on the whole liquid crystal layer 130. Although not illustrated, if polarization directions of two polarizers attached to the first and second substrates 110, 111 are parallel, light is transmitted in the liquid crystal only when the voltage is applied. This is called the normally black mode. Further, in the present embodiment, only the liquid crystal molecules are aligned by the first and second alignment layers 123a, 123b, and a desirable normally black mode is also obtained by adding a chiral dopant to the liquid crystal after depositing an alignment layer on the first substrate 110 or the second substrate 111.

As discussed above, a difference between the present embodiment and the prior art is that the common electrode 109 including a transparent metal is formed on the passivation layer 120, thereby improving the aperture ratio.

FIG. 4 is a drawing showing another embodiment in accordance with the present invention. In the present embodiment, the common electrode 209 including an ITO is formed with the data electrode 208 on the gate insulator 212. At this time, the common line 203 may be formed with the common electrode 209 by a single process using ITO, or with the data electrode 208 by a different process using an opaque metal such as Al, Cr, Ti, or Al alloy.

A plane electric field is generated at the surface of the substrate where the electrodes 208, 209 are formed in parallel in the same plane, thereby improving the viewing angle characteristic. Further, as shown in the drawing, if the passivation layer 220 in the pixel region is etched, a strong electric field is created between the electrodes 208, 209 by the electric field which is directly applied to the liquid crystal layer 230 without passing through the passivation layer 220 because the passivation layer 220 only covers the TFT region. This strong electric field causes the liquid crystal molecules in the liquid crystal layer 230 to switch faster, thereby making it possible to obtain an improved moving image.

In accordance with the present invention, since the common electrode includes a transparent metal, the opening or aperture ratio is improved. Also, the gate and/or date pads are prevented from oxidizing because a metal layer is formed by a same process in the pad region when the common electrode is formed on the passivation layer. Furthermore, since a strong plane electric field is applied to the liquid crystal layer where the passivation in the pixel region is etched when the common and data electrodes are formed on the same plane, it is possible to obtain an improved viewing angle characteristic and to prevent a break down of the moving image by making the liquid crystal molecules to switch faster. Accordingly, the in-plane switching mode liquid crystal display device of the present invention obtains a high ratio of aperture by using a transparent metal as the common electrode.

It will be apparent to those skilled in the art that various modifications and variation can be made in the in-plane switching mode liquid crystal display device of the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device comprising:

first and second substrates;

a plurality of gate and data bus lines defining pixel regions and arranged on said first substrate;

a plurality of thin film transistors adjacent respective cross points of said gate and data bus lines;

a plurality of gate electrodes connected to said gate bus lines;

a gate insulator on said gate electrodes;

at least a pair of first and second transparent electrodes, said first and second electrodes being formed on the same layer over said gate insulator and applying plane electric fields; and a passivation layer over thin film transistors.

2. The in-plane switching mode liquid crystal display device according to claim 1, wherein each of said thin film transistors comprises a semiconductor layer on said gate insulator, a channel layer on said semiconductor layer, and source and drain electrode on said channel layer, one of said source and drain electrodes being connected to said data bus lines.

3. The in-plane switching mode liquid crystal display device according to claim 1, wherein said gate insulator is on a substantially entire surface of said first substrate.

4. The in-plane switching mode liquid crystal display device according to claim 1, wherein said first electrodes include data electrodes and transparent second electrodes include common electrodes.

5. The in-plane switching mode liquid crystal display device according to claim 1, wherein said first and second transparent electrodes include indium tin oxide.

6. The in-plane switching mode liquid crystal display device according to claim 1, further comprising:

a gate pad on the first substrate, the gate pad having a portion exposed by an opened portion of the passivation layer; and a transparent conductive material covering the exposed portion of the gate pad through the opened portion of said passivation layer on said first substrate, wherein said transparent conductive material is formed with said first transparent electrode or said second transparent electrode at the same time.

7. The in-plane switching mode liquid crystal display device according to claim 6, wherein said transparent conductive material is directly on said gate pad.

8. The in-plane switching mode liquid crystal display device according to claim wherein said transparent conductive material includes indium tin oxide.

9. The in-plane switching mode liquid crystal display device according to claim 1, further comprising:

a data pad on the gate insulator, the data pad having a portion exposed by an opened portion of the passivation layer; and a transparent conductive material covering the exposed portion of the data pad through the opened portion of said passivation layer on said gate insulator, wherein said transparent conductive material is formed with said first transparent electrode or said second transparent electrode at the same time.

10. The in-plane switching mode liquid crystal display device according to claim 9, wherein said transparent conductive material is directly on said data pad.

11. The in-plane switching mode liquid crystal display device according to claim 9, wherein said transparent conductive material includes indium tin oxide.

12. The in-plane switching mode liquid crystal display device according to claim 1, further comprising an alignment layer on said first substrate.

13. The in-plane switching mode liquid crystal display device according to claim 12, wherein said alignment layer includes one of polyimide, polyamide, and photosensitive material.

14. The in-plane switching mode liquid crystal display device according to claim 13, wherein said photosensitive material is selected from the group consisting of polyvinylcinnamate and polysiloxanecinnamate.

15. The in-plane switching mode liquid crystal display device according to claim 1, further comprising:

a black matrix for preventing light from leaking around said thin film transistor, said gate bus line, and data bus line;

a color filter layer on said second substrate; and a liquid crystal layer between said first and second substrates.

16. The in-plane switching mode liquid crystal display device according to claim 15, further comprising an overcoat layer on said color filter layer.

17. The in-plane switching mode liquid crystal display device according to claim 1, further comprising an alignment layer on said second substrate.

18. The in-plane switching mode liquid crystal display device according to claim 17, wherein said alignment layer includes one of polyimide, polyamide, and photosensitive materials.

19. The in-plane switching mode liquid crystal display device according to claim 18, wherein said photosensitive material is selected from the group consisting of polyvinylcinnamate and polysiloxanecinnamate.

* * * * *